Patented May 13, 1930

1,758,841

UNITED STATES PATENT OFFICE

MAX ALBERT KUNZ, OF MANNHEIM, SWITZERLAND, AND KARL KÖBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

TRIHALOGENATED MS-BENZDIANTHRONES

No Drawing. Original application filed June 16, 1927, Serial No. 199,421, and in Germany March 15, 1926. Divided and this application filed February 2, 1928. Serial No. 251,455.

This application contains subject matter which has been divided out from our copending application for patent, Ser. No. 199,421, filed June 16, 1927.

We have found that by treating ms-benzdianthrone and its derivatives with halogen or substances liberating halogen, at atmospheric pressure and preferably in the presence of a halogen transporter, halogen derivatives are produced, the tinctorial properties of which meet all requirements of practice. In the manner described more or less highly halogenated derivatives can be obtained.

The most valuable products obtainable according to the present invention are the tri-halogen derivatives.

The following examples will further illustrate how our invention may be carried out in practice, but the invention is not limited to these examples. The parts are by weight.

Example 1

100 parts of bromine are introduced, drop by drop, into a solution of 100 parts of ms-benzdianthrone in 1000 parts of nitrobenzene at room temperature. The mass is stirred for one hour, whereupon the temperature is raised to 60° C. and stirring continued at this temperature for three further hours. The reaction product is then allowed to cool. The brownish-black crystals, which separate out, consist of the hydrobromic acid oxonium salt of dibrom-ms-benzdianthrone, from which the dibrom-ms-benzdianthrone corresponding to the formula

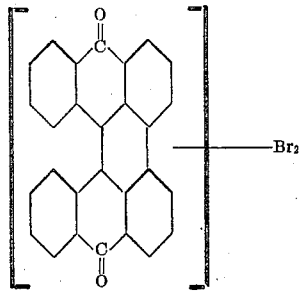

can be easily obtained, for instance by precipitation from a solution in concentrated sulfuric acid. The new coloring matter dissolves with a blue color in concentrated sulfuric acid and crystallizes from benzene in orange-yellow needles. Cotton is dyed from the green vat strong yellow shades.

Example 2

100 parts of ms-benzdianthrone and 5 parts of iodine are dissolved in 750 parts of nitrobenzene. 200 parts of bromine are added to the solution, drop by drop, while stirring at about 100° C. As soon as all of the bromine has been added, the temperature is slowly raised to about 150-160° C. and the mixture maintained at this temperature for four hours. After cooling down, the precipitate is filtered off by suction. A brownish-yellow powder is thus obtained, which when recrystallized from nitrobenzene gives brownish-yellow needles of tribrom-ms-benzdianthrone. This substance dissolves in concentrated sulfuric acid with a bluish green color, and gives very strong golden-yellow shades on cotton.

Example 3

150 parts of sulfuryl chlorid are added at 60° C. while stirring to a solution of 100 parts of ms-benzdianthrone in 400 to 500 parts of nitrobenzene to which about 5 parts of iodine have been added. The mixture is stirred for 6 hours at this temperature, allowed to cool, and filtered with suction. The remainder of the reaction product can be isolated from the filtered liquid by driving off the nitrobenzene by means of steam. The yield is quantitative by recrystallization from nitrobenzene yellow needles of trichlor-ms-benzdianthrone, which dissolve in concentrated sulfuric acid with a blue color, are obtained; the product dyes cotton from the green vat strong golden-yellow shades.

What we claim is:

1. As new articles of manufacture tri-halogen-ms-benzdianthrones.

2. As a new article of manufacture tribrom-ms-benzdianthrone.

In testimony whereof we have hereunto set our hands.

MAX ALBERT KUNZ.
KARL KÖBERLE.

CERTIFICATE OF CORRECTION.

Patent No. 1,758,841.   Granted May 13, 1930, to

MAX ALBERT KUNZ ET AL.

It is hereby certified that error appears in the above numbered patent requiring correction as follows: In the grant and in the heading to the printed specificationthe residence of the first named patentee was erroneously written and printed as "Mannheim, Switzerland", whereas said residence should have been written and printed as Mannheim, Germany; and that the said Letters Patent should be read with this correction therein that the same may conform to the record of the case in the Patent Office.

Signed and sealed this 5th day of August, A. D. 1930.

(Seal)

Wm. A. Kinnan,
Acting Commissioner of Patents.